United States Patent
Jeong et al.

(10) Patent No.: US 8,762,442 B2
(45) Date of Patent: Jun. 24, 2014

(54) FAST ITERATIVE METHOD FOR PROCESSING HAMILTON-JACOBI EQUATIONS

(75) Inventors: Won-ki Jeong, Arlington, MA (US); Ross Whitaker, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 1002 days.

(21) Appl. No.: 12/740,061

(22) PCT Filed: Oct. 30, 2008

(86) PCT No.: PCT/US2008/081855
§ 371 (c)(1),
(2), (4) Date: Aug. 27, 2010

(87) PCT Pub. No.: WO2009/059045
PCT Pub. Date: May 7, 2009

(65) Prior Publication Data
US 2011/0046927 A1    Feb. 24, 2011

Related U.S. Application Data

(60) Provisional application No. 61/001,221, filed on Oct. 30, 2007.

(51) Int. Cl.
*G06F 7/544* (2006.01)
*G06F 17/17* (2006.01)

(52) U.S. Cl.
USPC ............................................. 708/446; 703/2

(58) Field of Classification Search
CPC ........................................................ G06F 17/13
See application file for complete search history.

(56) References Cited

U.S. PATENT DOCUMENTS

2007/0186206 A1    8/2007    Abrams et al.

FOREIGN PATENT DOCUMENTS

JP    2002/006904    1/2002

OTHER PUBLICATIONS

Rawlinson et al. "Wave front evolution in strongly heterogeneous layered media using the fast marching method" Geophysi. J. Int. 2005, 156, pp. 631-647.*

Herrmann, M. "A domain decomposition parallelization of the Fast Marching Method", 2003, pp. 213-225.*

* cited by examiner

*Primary Examiner* — Suzanne Lo
(74) *Attorney, Agent, or Firm* — Thorpe North & Western LLP (57) ABSTRACT

A system and method are provided for a parallel processing of the Hamilton-Jacobi equation. A numerical method is provided to solve the Hamilton-Jacobi equation that can be used with various parallel architectures and an improved Godunov Hamiltonian computation.

13 Claims, 5 Drawing Sheets

| | 29 | 30 | 31 | 32 | |
|---|---|---|---|---|---|
| 20 | 13 | 14 | 15 | 16 | 24 |
| 19 | 9 | 10 | 11 | 12 | 23 |
| 18 | 5 | 6 | 7 | 8 | 22 |
| 17 | 1 | 2 | 3 | 4 | 21 |
| | 25 | 26 | 27 | 28 | |

(a) Pixel indices   (b) Bank assignment   (c) Left neighbors

FIG. 5

FIG. 6

FAST ITERATIVE METHOD FOR PROCESSING HAMILTON-JACOBI EQUATIONS

PRIORITY CLAIM

This application claims the benefit of U.S. Provisional Patent Application Ser. No. 61/001,221, filed Oct. 30, 2007 which is incorporated herein by reference.

BACKGROUND

The applications of solutions to the H-J equation are numerous. The equation arises in the fields of computer vision, image processing, geoscience, and medical imaging and analysis. For example in computer vision, the shape-from-shading problem, which infers 3D surface shape from the intensity values in 2D image, can be modeled and solved with the Eikonal equation, which is a special form of the H-J equation. Extracting the medial axis or skeleton of the shape can be done by analyzing solutions of the H-J equation with the boundaries specified at the shape contour.

Solutions to the H-J equation have been proposed for noise removal, feature detection and segmentation. In physics, the H-J equation arises in models of wavefront propagation. For instance, the calculation of the travel times of the optimal trajectories of seismic waves is a critical process for seismic tomography. Several methods based on the H-J equation have also recently been introduced as a means for describing connectivity in white matter in medical image analysis.

The Hamilton-Jacobi partial differential equations (PDEs), are given by the following equation (1):

$$H(\nabla u, x) = 1, \forall x \in \Omega \qquad (1)$$

where $\Omega$ is a domain in $R^n$, $u(x)$ is solution, which can be considered as a travel time or distance from the boundary conditions. Of particular interest is the special form $$H(\nabla u, x) = \sqrt{(\nabla u) M (\nabla u)^T} \qquad (2)$$

where M is the speed tensor matrix defined on $\Omega$. We use the Hamiltonian equation defined below for our model equation (3):

$$H(p, q, r) = \sqrt{ap^2 + dq^2 + fr^2 + 2(bpq + cpr + eqr)} \qquad (3)$$

$$M = \begin{bmatrix} a & b & c \\ b & d & e \\ c & e & f \end{bmatrix}, p = \frac{\partial H}{\partial x}, q = \frac{\partial H}{\partial y}, r = \frac{\partial H}{\partial z}$$

where p, q, and r are partial derivatives of $u_i$ at x along x, y, and z axis, and a, b, c, d, e, and f are upper triangular elements of the matrix M. Equation 1 becomes the Eikonal equation when M is an identity matrix times a scalar function, f( ) which is often called the speed function.

A number of different numerical strategies have been proposed to efficiently solve the H-J equation. These methods can generally be classified into two groups. One group is a class of iterative methods based on a fixed-point update using Jacobi or Gauss-Seidel schemes. Other early work solves the Eikonal equation, a special case of H-J equation, by updating the solutions of the grid using a pre-defined updating order and Godunov upwind Hamiltonian until they converge. This method is simple to implement and produces viscosity solutions, but involves many iterations to converge, and for the worst case situation, complexity can approach the order of O(N2) where N is the number of data elements to be processed. A Fast Sweeping method has also been proposed, which uses a Gauss-Seidel updating order for fast convergence. The Fast Sweeping method has a computational complexity on the order of O(kN) where N is the number of elements to be processed and k depends on the complexity of the speed function. The Fast Sweeping method and a Godunov upwind discretization of the class of convex Hamiltonians can be employed to solve anisotropic H-J equations. Another interpretation of Hamiltonians has been introduced based on the Legendre transformation, which appears to be a Godunov Hamiltonian. This method employs the Lax-Friedrichs Hamiltonian for arbitrary static H-J equations. The proposed method is simple to implement and can be used widely on both convex and non-convex H-J equations, but it involves many more iterations than the Godunov Hamiltonian and the solution shows excessive diffusion due to the nature of the scheme. In general, the iterative methods are slow to converge and are not suitable for interactive applications.

The second group of H-J solvers is based on adaptive updating schemes and sorting data structures. A Dijkstra-type shortest path method has been used to solve convex H-J equations, which are generally referred to as the Fast Marching methods. The main idea behind this method is that solutions for a convex Hamiltonian depend only on the upwind neighbors along the characteristics, so the causality relationship can be determined uniquely and the correct solutions can be computed by only a single pass update. The complexity of the Fast Marching method is O(NlogN), which is the best possible (optimal) asymptotic limit for the worst-possible input data (i.e. worst-case optimal). In this algorithm the running time is slightly affected by the complexity of the speed function. However, for a class of general H-J equations, tracing the characteristics can cause expensive searching among a wider range of neighborhoods of nodes than solving equations using an iterative numerical method. In addition, the method uses a global sorting data structure, e.g., a heap, and therefore the parallelization is not straightforward.

DETAILED DESCRIPTION

Reference is now be made to the exemplary embodiments illustrated in the drawings, and specific language is used herein to describe the same. It should nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A system and method are provided for a parallel method for computing numerical approximations of the H-J equation on a discrete grid in the domain and the implementation on the GPU to make comparisons against other state-of-the-art methods. While the worse-case performance of the proposed method is not optimal, it enhances performance relative to the worst case of other methods on a variety of complex data sets, on a single processor, and scales well on many parallel architectures for a further performance benefit. A numerical method is described to solve the H-J equation that can be well-adapted to various parallel architectures, an improved Godunov Hamiltonian computation, and a GPU implementation of the proposed H-J solver.

Various embodiments of the present techniques are described further below. For instance, as one embodiment of the present techniques, a fast iterative method (FIM) for parallel systems is discussed. As another embodiment of the present techniques, a 3D Godunov Hamiltonian for the H-J equation is introduced and described in its implementation. Further still, in another embodiment of the present techniques, a GPU implementation of the proposed method is also discussed. Finally, the numerical results on several synthetic and real tensor volumes as compared with the existing state-of-the-art CPU methods are also discussed.

The computational technique discussed further below is referred to as the Fast Iterative Method (FIM), which can solves a class of Hamilton-Jacobi (H-J) equations on parallel systems. The method manages a list of active nodes and iteratively updates solutions on those nodes until they converge. Nodes are added to or removed from the list based on a convergence measure, but the management of this list does not involve extra burden of expensive ordered data structures or special updating sequences.

While the method has suboptimal worst-case performance, in practice involving real and synthetic datasets, the method performs fewer computations per node than other known alternatives. Furthermore, the method uses only local, synchronous updates and therefore has better cache coherency, is simple to implement, and scales efficiently on parallel architectures, such as cluster systems or graphics processing units (GPUs).

Fast Iterative Method (FIM)

To solve Equation 1 efficiently, which is noted above, a numerical method is provided that is scalable on parallel architectures. As discussed previously, existing H-J solvers do not scale effectively on computer architectures that incorporate multiple processors (parallel architectures), because the use of global data structures and the prescribed updating orders limit the ability to do multiple updates of the solution simultaneously. Therefore, to provide enhancements over the previous methods, the present techniques provide benefits by producing enhanced overall performance, cache coherence, and scalability across multiple processors. These enhancements result from: 1) not imposing a particular update order, 2) not using a separate, heterogeneous data structure for sorting, and 3) providing simultaneously updates at multiple points.

FIM is a numerical method to solve PDEs, such as Equation 1, on parallel architectures. The FIM can solve the H-J equation selectively on the grid nodes without maintaining expensive data structures. FIM maintains a narrow band, called the active list, for storing the index of grid nodes to be updated. Instead of using a special data structure to keep track of exact causal relationships, the method maintains a looser relationship and updates all nodes in the active list simultaneously (i.e., Jacobi update). During each iteration, the list of active nodes is expanded, and the band thickens or expands to include all nodes that could be influenced by the current updates. A node can be removed from the active list when the solution is converged, and re-inserted when any changes of its adjacent neighbors affect the solution of the current node. Note that newly inserted nodes are updated in the following update iteration to ensure a correct Jacobi update. To compute the solutions of the nodes in the active list, a Godunov upwind discretization of the Hamiltonian is used. This method can allow multiple updates per node by reinserting nodes to the active list, and use a Jacobi update for parallel computation. The proposed method falls under the class of label correcting methods. The pseudo code of one embodiment of the FIM, which may be referred to as Method 2.1, is as follows (Ux is a discrete approximation of u(x), and g(Ux) is a new solution at x that satisfies Equation 1 computed using a Godunov Hamiltonian $H_G$ in Equation (3). This pseudo code is listed below in Method 2.1 FIM (X):

---

Method 2.1: FIM(X)

comment: 1. Initialization (X: set of all grid nodes, L: active list)
for each x ∈ X $$\text{do} \begin{cases} \text{if x is source} \\ \text{then } U_x \leftarrow 0 \\ \text{else } U_x \leftarrow \infty \end{cases}$$

for each x ∈ X $$\text{do} \begin{cases} \text{if any neighbor of x is source} \\ \text{then add x to L} \end{cases}$$

comment: 2. Update nodes in L
while L is not empty $$\text{do} \begin{cases} \text{for each } x \in L \\ \text{do} \begin{cases} p \leftarrow U_x \\ q \leftarrow g(U_x) \\ \text{if } p > q \\ \quad \text{then } \{U_x \leftarrow q \\ \text{if } |p-q| < \epsilon \\ \text{then} \begin{cases} \text{for each 1-neighbor } x_{nb} \text{ of } x \\ \text{do} \begin{cases} \text{if } x_{nb} \text{ is not in L} \\ \text{then} \begin{cases} p \leftarrow U_{x_{nb}} \\ q \leftarrow g(U_{x_{nb}}) \\ \text{if } p > q \\ \text{then} \begin{cases} U_{x_{nb}} \leftarrow q \\ \text{add } x_{nb} \text{ to L} \end{cases} \end{cases} \end{cases} \end{cases} \\ \text{remove x from L} \end{cases} \end{cases}$$

---

Figure 1:
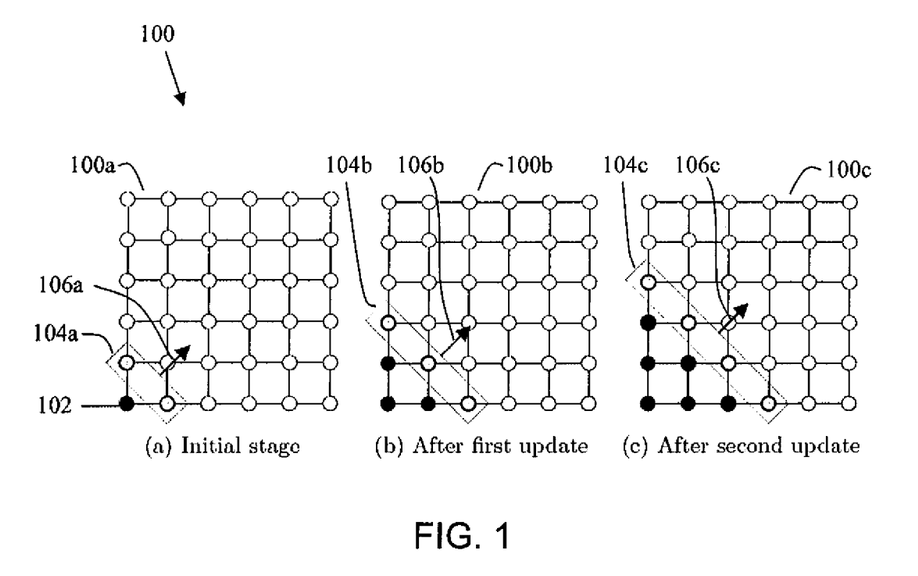
FIGS. 1A-1C illustrate a schematic 2D example of FIM frontwave propagation in accordance with certain aspects of the present techniques.

The properties of the method are now further described. FIG. 1 illustrates a schematic 2D example 100 of FIM frontwave propagation in accordance with certain aspects of the present techniques. In FIGS. 1A-1C, the schematic 2D example is of a FIM frontwave expanding in the first quadrant. The lower-left corner point 102 is the source point, the black points are fixed points, the diagonal rectangle 104a-104c containing blue points is the active list, and the black arrow 106a-106c represents the narrow band's advancing direction. The initial stage 100a is shown in FIG. 1A, the first update stage 100b is shown in FIG. 1B, and the second update stage 100c is shown in FIG. 1C. Because blue points depend only on the neighboring black points, all of the blue points in the active list can be updated at the same time. If the characteristic path does not change its direction to the other quadrant, then all the updated blue points are fixed (become black points) and their 1-neighbor white points form a new narrow band.

Figure 2:
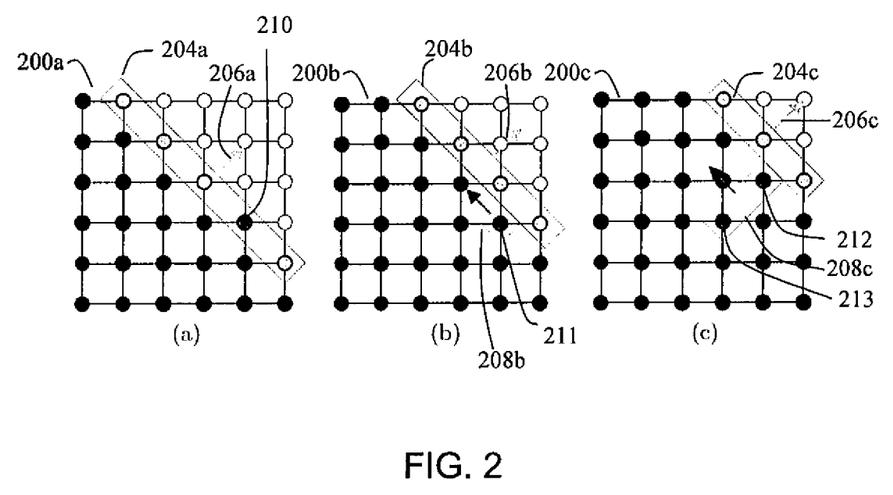
FIGS. 2A-2C illustrate a schematic 2D example of the change of the characteristic direction in accordance with certain aspects of the present techniques.

The FIM is an iterative method, meaning that a point is updated until its solution converges. However, for many data sets, most points require only a single update to converge. This can be interpreted as follows. If the angle between the direction of the characteristic path and the narrow band's advancing direction is smaller than 45 degree, then the exact solution at the point can be found only in a single update, as in the fast sweeping method. If the angle is larger than 45 degrees, the point at the location where the characteristic path changes direction have an initial value that is computed using the wrong set of neighboring nodes on the grid. In other words, the neighbors should be an "up-wind neighborhood," that is located in the direction from which the wavefront associated with the solution is propagating and it is revised in successive iterations as neighbors refine their values. Thus, that point is not removed from the active list and is updated until the correct value is computed. FIGS. 2A-2C relate to an example of this type of situation.

The Godunov Hamiltonian uses a neighborhood that may be 1-node in dimension surrounding the center node, so it can be mapped to iterative schemes. However, the term neighborhood can be defined as a set of nodes on the grid that are within as specified grid distance. That is, in two dimensions, as in FIGS. 1a-c and 2a-c, the nearest neighbors are the nodes that are immediately up, down, left, and right of the node in question. The neighborhood size may depend on the particular H-J formulation and the numerical approximation. For instance, if the neighborhood includes diagonal relationships on the grid, there are many cases to check for the correct solution of the Hamiltonian, e.g., eight cases for 2D and 26 cases for 3D solution. While the drawings are used to illustrate two dimensional (2D) examples of using the present system and method, the use of the present method with (3D) volumes is also readily applicable and expected.

FIGS. 2A-2C are schematic 2D examples 200a-200c of the change of the characteristic direction in accordance with certain aspects of the present technique. In these examples 200a-200c, similar to the discussion of FIGS. 1A-1C, the black points are fixed points, the diagonal rectangle 204a-204c containing blue points are the active list, and the black arrow 206a-206c represents the narrow band's advancing direction. However, unlike the Fast Marching method, where the wavefront propagates with closed, 1-point-thick curves, the FIM can result in thicker bands that split in places where the characteristic path changes the direction (e.g., the red points 210-213 in FIGS. 2A-2C). Also, the wavefront of updated nodes can move over solutions for nodes whose values are considered correct with respect to their previous neighborhood values (i.e. they have already converged), and reactivate them. In this case, the algorithm reactivates these nodes to correct values as new information is propagated across the image. Thus, the worst-case performance of FIM is suboptimal.

Appendix A and B are provided that include implementation details for the present system and method and Appendix A and B are incorporated herein by reference.

The following section gives the results of empirical studies, including situations where this worst-case behavior undermines computational efficiency of FIM and compares the results with those of the other state-of-the-art solvers.

The discussion below provides a proof of the correctness of the method described.

Lemma 2.1. FIM Method Converges.

Proof. For this we rely on monotonicity (decreasing) of the solution and boundedness (positive). From the pseudo code listed above in Method 2.1, when a point is added to the active list, its tentative solution is updated only when the new solution is smaller than the previous one. As such, all updates are positive by construction.

Lemma 2.2. The solution U at the completion of FIM method with $\epsilon=0$ (error threshold) is consistent with the corresponding Hamiltonian given in Equation 1.

Proof. Each point in the domain is appended to the active list at least once. Each point x is finally removed from L only when $g(U, x)=0$ and the upwind neighbors (which impact this calculation) are also inactive. Any change in those neighbors causes x to be re-appended to the active list. Thus, when the active list is empty (the condition for completion), $g(U, x)=0$ for the entire domain.

Theorem 2.3. FIM method, for Q=0 gives an approximate solution to Equation 1 on the discrete grid.

Proof. The proof of the theorem is given by the convergence and consistency of the solution, as given lemmas above.

Godunov Hamiltonian for the Hamilton-Jacobi Equation

In this section, the details of Godunov discretization of H-J Hamiltonian are on a 3D grid, which is an extension of the 2D case is described. The simplest way to solve Equation 1, which is noted above, is computing p, q, and r using a central difference method and solving a quadratic equation, but this approach requires global updates to converge. However, because convex Hamiltonians have strict causality relations with adjacent neighbors, there is a more efficient way to solve the equation. One approach is using only one-sided derivatives to compute Hamiltonians, e.g., Godunov upwind scheme. Accordingly, a similar Godunov upwind Hamiltonian may be employed, but the current technique provides an efficient method to evaluate the Hamiltonian.

Definition

The Godunov Hamiltonian $H_G$ for the H-J equation can be defined as follows:

$$H_G(p, q, r) = ext_{p \in I[p_-, p_+]} ext_{q \in I[q_-, q_+]} ext_{r \in I[r_-, r_+]} H(p, q, r) \quad (3)$$

where $$ext_{x \in I[a,b]} = \min_{x \in [a,b]} \text{ if } a <= b$$

$$ext_{x \in I[a,b]} = \min_{x \in [b,a]} \text{ if } a > b$$

$p\pm=D_\pm^x u$, $q\pm=D_\pm^y u$, $r\pm=D_\pm^z u$, and I[a, b] is the closed interval bounded by a and b. This definition of the Godunov Hamiltonian looks complicated, but the main idea is evaluating the Hamiltonian H(p, q, r) with all possible combination of $p=\{p_-, p_+, p_o\}$, $q=\{q_-, q_+, q_o\}$, and $r=\{r_-, r+, r_o\}$ where $p_o$, $q_o$, and $r_o$ are critical points (because the extremum of a convex Hamiltonian occurs only on either the end of the interval or the critical point), and taking the valid minimum solution that satisfies Equation 1. As a result, eight cases are used for 2D and 26 cases are used for 3D to evaluate the Hamiltonian (we do not evaluate for $H(p_o, q_o, r_o)$). To check the validity of the solution for H(p, q, r), a variety of approaches may be utilized. For instance, the following conditions have been proposed.

$H(\text{sgn max}\{(p_--p_\sigma)^+, (p_+-p_\sigma)^-\}+p_\sigma, q, r)=1$ $H(p, \text{sgn max}\{(q_--q_\sigma)^+, (q_+-q_\sigma)^-\}+q_\sigma, r)=1$ $H(p, q, \text{sgn max}\{(r_--r_\sigma)^+, (r_+-r_\sigma)^-\}+r_\sigma)=1$ Even though the above test to check the validity of the solution appears to be mathematically correct, practically it is not efficient due to two reasons. First, this test requires three evaluations of the Hamiltonian, which is an expensive operation. Second, a threshold needs to be used to numerically check the float equality (|H−1|<Q), which may induce numerical errors. As such, a new validity test is provided that is based on the observation that if the solution is valid then p, q, and r used to compute the solution are correct values. For example, if we use p=p_, then sgn max$\{(p_--p_\sigma)^+, (p_+-p_\sigma)^-\}+p_\sigma=p_-$ holds. Checking equality for this equation can be done efficiently because we can encode the left and the right side of the equation using integers, +1, 0, and −1, and compare equality of the integers. The right side index is determined by p, and the left side index is determined by p−, p+, and p_ based on the new solution.

$$\text{Right side index} = \begin{cases} 0 & \text{if } p = p_\sigma \\ +1 & \text{if } p = p_+ \\ -1 & \text{if } p = p_- \end{cases}$$

$$\text{Left side index} = \begin{cases} 0 & \text{if } p_- < p_\sigma < p_+ \\ +1 & \text{else if } (p_- + p_+)/2 < p_\sigma \\ -1 & \text{else} \end{cases}$$

The proposed validity test does not entail an extra burden of Hamiltonian computations, and can be done using only simple integer equality and float inequality comparisons. Experiments show that using the new validity test can increase the performance by up to about 50% compared to the original method.

GPU Implementation

The FIM method should scale well on various parallel architectures, e.g., multi-core processors, shared memory multiprocessor machines, or cluster systems. Under the present techniques, the GPU was selected to implement FIM to solve the H-J equation because the current GPUs are massively parallel SIMD processors, providing a very powerful general-purpose computational platform. One of the differences between the CPU and the GPU implementation of FIM is that the GPU employs a block-based updating scheme, because the GPU architecture favors coherent memory access and control flows. The original node-based FIM (Method 2.1) can be easily extended to a block-based FIM as shown in Method 4.1, which is included below. For a block based update, the domain is decomposed into pre-defined size blocks (we use a 43 cube for 3D in the GPU implementation), and solutions of the pixels in the same block are updated simultaneously with a Jacobi update scheme. Therefore, the active list of the GPU maintains the list of active blocks instead of nodes.

The GPU FIM method includes three steps. First, each active block is updated with a pre-defined number of iterations. During each iteration, a new solution of Equation 1 is computed, replace the old solution if the new solution is smaller, and its convergence is encoded as a Boolean value. After the update step, a reduction on each active block is performed to check whether it is converged or not. If a block is converged, it is marked as to-be-removed. The second step is checking which neighbor blocks of to-be-removed blocks need to be re-activated. To do this, all the adjacent neighbor blocks of to-be-removed blocks are updated once, and another reduction operation is applied on each of the neighbor blocks. The final step is updating the active list by checking the convergence of each block and removing or inserting only active blocks to the active list. The following is a GPU FIM pseudo code, which may be referred to as Method 4.1, for updating active blocks (Cp and Cb are introduced in Section 4.2).

---

4.1: GPU FIM(L, V)

comment: Update blocks b in active list L, V:list of all blocks
while L is not empty

```
  comment Step 1 – Update Active Blocks
  for each b ∈ L
    do  for i = 0 to n
          do {(b, C_p(b)) ← g(b)
          C_b(b) ← reduction(C_p(b))

comment Step 2 – Check Neighbors
  for each b ∈ L and
do  if C_b(b) = true
      then  for each 1-neighbor b_nb of b
              do  (b_nb, C_p(b_nb)) ← g(b_nb)
                  C_p(b_nb) ← reduction(C_p(b_nb))

comment Step 3 – Update Active List
  clear(L)
  for each b ∈ V
    do  if C_b(b) = true
          then {Insert b to L
```

---

GPU Implementation Detail

The GPU H-J solver may be implemented on an NVIDIA graphics card. NVIDIA is used for GPU programming, and explains the GPU implementation details based on the CUDA programming model (CUDA is an extension to the C programming language, invented by NVIDIA Corp, specifically for programming their graphics chips), so please refer the CUDA programming guide for more details about the GPGPU programming using CUDA. Computing on the GPU involves running a kernel with a batch process of a large group of fixed size thread blocks, which is suited for the block-based update method used in the FIM method. If the block size to 43 is fixed, so 64 threads share the same shared memory and are executed in parallel on the same processor unit. Because it is not necessary to use special data structures, e.g., list or vector, to implement the active list on the GPU, a simple 1D integer array is used whose size is the total number of blocks to store active blocks, Only the array elements of index ranging between 0 to (number of total active blocks−1) are valid at any given time. For each CUDA kernel call, the grid size is adjusted to the current number of active blocks; and when a block is being processed, its block index is retrieved from the active list on the GPU. Updating solutions and reductions, which are computationally dominant in the overall process, are done entirely on the GPU.

On the GPU memory, two sets of Boolean arrays, one Cp with a size of # of pixels (i.e., nodes), and the other Cb with a size of # of blocks, are created to store convergence of pixels and blocks, in addition to a float array with a size of # of pixels to store solutions. To check the convergence of blocks, a reduction on Cp to get Cb is performed. Managing the active list, e.g., inserting or deleting blocks from the list, is efficiently done on the CPU by reading back Cb to the CPU and looping over it to insert only non-converged blocks to the active list. When the list is completely updated on the CPU, it is copied to the GPU, but only a small part of the active list is actually used at any given time (index 0 to (# of active blocks−1)), so only a small fraction of contiguous memory needs to be copied to the GPU.

Data Packing for Coalesced Global Memory Access

Figure 3:
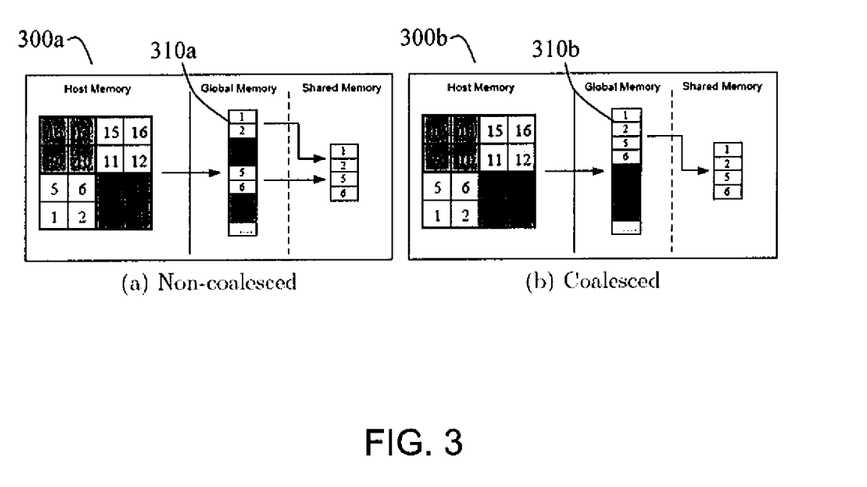
FIGS. 3A-3B are exemplary coalesced/non-coalesced global memory accesses in accordance with certain aspects of the present techniques.

To efficiently move data from global to shared memory on the GPU, the data is arranged in the GPU memory space in a certain way to access global memory as coalesced as possible. A volume is stored in memory as a 1D array with a certain traversing order. FIGS. 3A-3B shows two different examples 300a and 300b for storing a 4×4 image in the GPU global memory space as 1D array when a block is copied to shared memory. Host memory is the CPU side memory, and global/shared memory is the GPU side memory. Color represents the pixels in the same block. Usually pixels are stored from the fastest to the slowest axis order, as shown in FIG. 3A. In this case, a block is split into two regions in global memory space 310a, which leads to split block accesses. However, if we re-order global memory 310b as shown in FIG. 3B, accessing a block can be a single coalesced memory access, which is the most efficient way to access global memory 310b on the GPU. Hence, whenever input volumes are copied from the CPU to the GPU memory, a proper reordering should be applied so that the block access can be done through a coalesced memory access.

Efficient Neighbor Access Using Shared Memory

Figure 4:
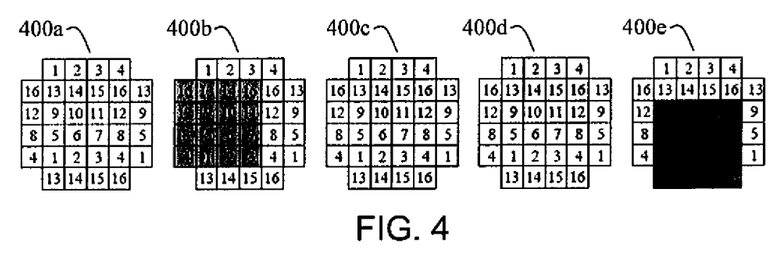
FIG. 4 is an exemplary 2D bank assignment that avoids bank conflicts for neighbor pixel access in accordance with certain aspects of the present techniques.

Another factor that affects the GPU performance is accessing shared memory. The shared memory space in the NVIDIA G80 architecture is divided into 16 banks, and 16 shared memory accesses can be done simultaneously as long as all the memory requests refer to different memory banks or to the same memory bank. If any two memory requests, but not all, refer to the same memory bank, i.e., bank conflict, then this request is serialized and impairs the performance. Because the block size is fixed as 43, there is no bank conflict to access pixels inside blocks (block size is a multiple of warp size). However, because adjacent neighbor pixels are used to solve the H-J equation, an additional shared memory space should be provided for left/right/up/down/top/bottom neighbors of the boundary pixels of each block. To avoid bank conflicts, the neighbor pixels are assigned to pre-defined banks, which requires a slightly larger extra shared memory space. FIG. 4 shows a 2D example diagrams 400a-400e of the bank assignment that avoids bank conflicts for neighbor pixel access. The block size for this example is 16 (4×4), which is drawn as a yellow box on the leftmost image in FIG. 4. The extra four pixels on each left/right/up/down side of the block are neighbor pixels. The number on each pixel represents the bank number to be assigned. By assigning pixels to shared memory in this pattern, memory requests for left/right/up/down neighbors can be done simultaneously without a bank conflict (FIG. 4; red: left neighbors, cyan: right neighbors, green: up neighbors, blue: down neighbors). The shared memory of size 3*block size to store a block and its neighbors is used because some bank numbers appear twice (1, 4, 13, and 16 in FIG. 4).

Figure 5:
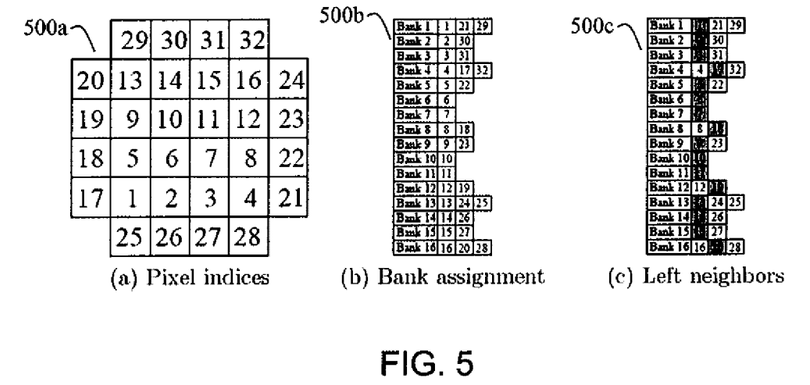
FIGS. 5A-5C are exemplary bank assignment in accordance with certain aspects of the present techniques.

Further, FIG. 5 shows an example of actual pixel assignment in shared memory. FIG. 5A shows a 2D block diagram 500a with pixel indices (not bank numbers). FIG. 5B shows a bank assignment listing 500b which listing the bank that each pixel is actually assigned to. FIG. 5C shows a snapshot 500c of a shared memory access pattern when left neighbors are accessed (same example as the diagram 400b in FIG. 4). Pixels colored in red are accessed by 16 threads in parallel, and because there is no bank conflict, this memory request can be processed simultaneously. The bank assignment technique shown here can be easily extended to 3D cases.

Reduction is one of the commonly used computational techniques in the streaming programming model to produce a smaller stream from a larger input stream. To check the convergence of a block, the convergence of every pixel in the block is checked.

Therefore, a block may be reduced down to a single pixel that represents the convergence of the block. Because CUDA provides a block-wise thread synchronization mechanism, a parallel reduction may be performed in a single kernel execution. To reduce a block of size n, start with two threads. For each iteration, every thread participating in reduction reads two convergence values from the current block and write a true or false to one of the original locations (both converge: true, else false). In the next iteration, the number of participating threads is halved and the same reduction is performed. This process is repeated until a block is reduced to a single pixel.

A parallel H-J solver based on the selective iterative method is described. The proposed method employs the narrow band approach to keep track of the points to be updated, and iteratively updates the solutions until they converge. Instead of using an expensive sorting data structure to keep the causality, the proposed method uses a simple list to store active points and updates all of them in parallel until they converge. The points in the list can be removed from or added to the list based on the convergence measure. The proposed method is simple to implement and runs faster than the existing solvers on a class of convex Hamilton-Jacobi equations. The prototype implementation on the GPU runs roughly fifty to one hundred times faster than the state-of-the-art CPU H-J solvers.

Introducing a fast parallel H-J solver opens up a numerous interesting future research directions. Because the GPU implementation provides rapid computation of distance computation on DT-MRI (Diffusion Tensor-Magnetic Resonance Imaging) volumes, this makes interactive white matter connectivity analysis feasible. Similarly, as another example, the present techniques may be used for seismic wave propagation simulation in an anisotropic speed volume. Alternatively, the present techniques may be used in fast geodesic computation on parametric surfaces or volumes.

As an example, the present technique could be used to compute solutions to H-J equations associated with grids (images) of diffusion weighted or diffusion tensor measurements from magnetic resonance imagery. Solutions to a H-J equation that depends on those measurements can be used to describe paths or subsets (regions) of node on the grid that connect specified regions of the brain. Those paths or regions could, in turn, be used to quantify, analyze, or detect neurological or psychiatric disorders.

As an additional example, the present technique can also be used to analyze the connected quality of a hydrocarbon-bearing reservoir and to obtain the hydrocarbons within the hydrocarbon-bearing reservoir. The method includes obtaining a model of a portion or a complete reservoir and dividing the model into cells, each cell having a volume and some attributes. The model may be a reservoir model of a hydrocarbon-bearing zone within a subsurface region. Then, a speed function may be assigned to a portion of the cells in the model. One of the cells may be selected as a reference cell. Following this selection, connectivity between cells is determined by solving an Eikonal equation, describing a propagating front in a heterogeneous medium. The front can progress outward from the reference cell until an ending condition is met. The ending condition may be a threshold or convergence limit. The Eikonal equation can be solved by a fast iteration method with propagation velocity as a function of spatial position being provided by the speed function. Following the solving operation, the regions of the model may be characterized by their connective quality to the reference cell using the connectivity. Finally, with this analysis, wells may be drilled to extract the hydrocarbons.

Figure 6:
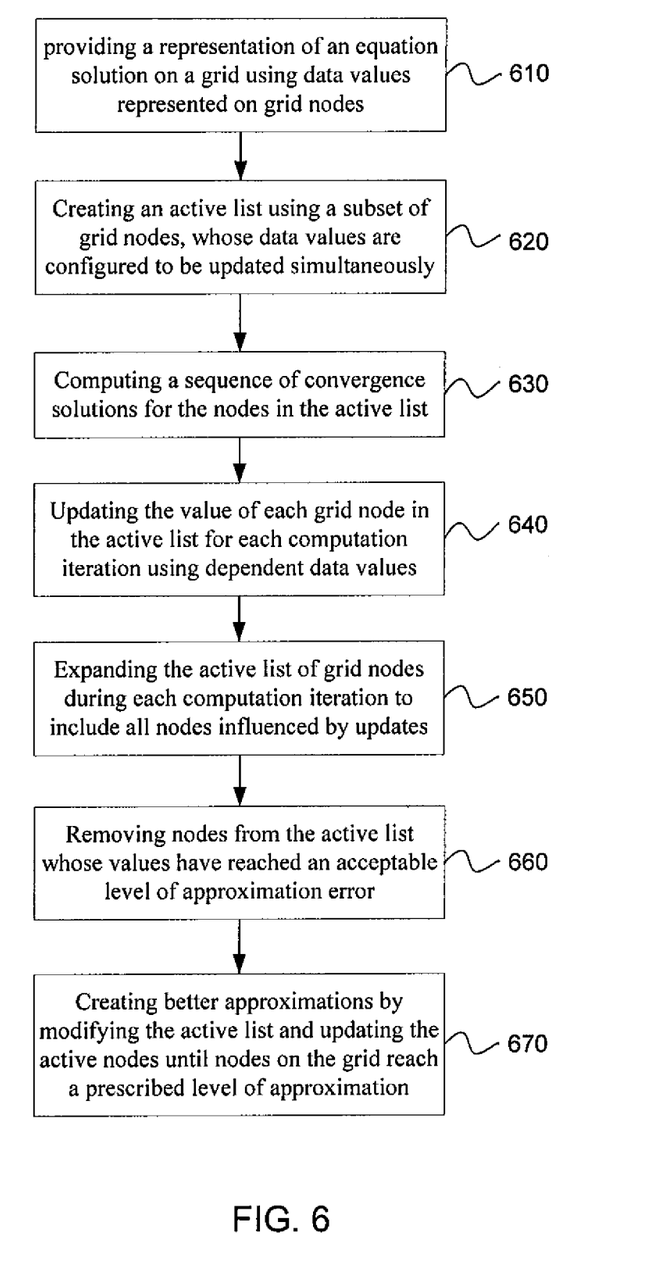
FIG. 6 is a flow chart illustrating a method for finding an approximation of a Hamilton-Jacobi equation using a parallel computing system in accordance with certain embodiments of the present techniques.

FIG. 6 illustrates an embodiment of a method for finding an approximation of a Hamilton-Jacobi equation using a parallel computing system. The method can include the operation of providing a representation of an equation solution on a grid using data values represented on grid nodes, as in block 610. Values on a grid nodes that are specified boundary conditions as part of the final approximation may also be set for the process.

An active list can be created using a subset of grid nodes, as in block 620. The data values for the grid nodes are configured to be updated simultaneously using an individual computing device for each grid node. A sequence of convergence solutions can be computed for the nodes in the active list that iteratively decrease the approximation error of the solution, as in block 630. The value of each grid node in the active list can be updated for each computation iteration using dependent data values of grid nodes from the previous iteration that are nearby in the grid, as in block 640.

In addition, the active list of grid nodes can be expanded for each computation iteration to include all nodes that are influenced by the updates to data values from the current iteration, as in block 650. The active list of computing nodes can be expanded during each computation iteration to include all the grid nodes that are influenced by the updates to data values from the current iteration. The updates and expansion are performed simultaneously on multiple, separate computer processors in a way that depends only on the previous iteration's solution and the current update of those grid nodes.

An additional operation is removing nodes from the active list whose values have reached an acceptable level of approximation error (e.g., reaches a convergence measure) after an update, as in block 660. The data point nodes in the active list can be updated by adding or removing active data point nodes from the active list based on a convergence measure. In addition a data point node can be re-inserted into the active list when changes of adjacent neighbors affect a solution of the previously removed data point node. As a result, a sequence of successively better approximations is created by modifying the active list and updating the active nodes until the active list is empty and all nodes on the grid approximate the Hamilton-Jacobi equation to a prescribed level of approximation, as in block 670. The approximated solution can also be displayed to an end user on a display screen using a display volume.

The present system and method can be applied in many fields of computing. For example, the present method can be used in computer graphics, medical imaging, remote imaging of oil and gas underground geologic structures, radar imaging, astronomical imaging, computer gaming, and a number of other similar uses.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method for finding an approximation of a Hamilton-Jacobi equation using a parallel computing system, comprising:
   under control of one or more computer systems configured with a processor and a memory;
      providing a representation of an equation solution on a grid using data values represented on grid nodes;
      creating an active list using a subset of grid nodes, whose data values are configured to be updated simultaneously using an individual computing device for each grid node;
      computing a sequence of convergence solutions for the nodes in the active list that iteratively decrease the approximation error of the solution;
      updating the value of each grid node in the active list for each computation iteration using dependent data values of grid nodes from the previous iteration that are nearby in the grid;
      expanding the active list of grid nodes during each computation iteration to include all nodes that are influenced by the updates to data values from the current iteration;
      removing nodes from the active list whose values have reached an acceptable level of approximation error after an update; and
      creating a sequence of successively better approximations by modifying the active list and updating the active nodes until the active list is empty and all nodes on the grid approximate the Hamilton-Jacobi equation to a prescribed level of approximation.

2. A method as in claim 1, further comprising setting of values on a subset of nodes on the grid that are specified as part of the final approximation.

3. A method as in claim 2, further comprising the set of setting values that are boundary conditions on a subset of nodes on the grid.

4. A method as in claim 1, wherein expanding the active list of computing nodes during each computation iteration to include all nodes that are influenced by the updates to data values from the current iteration is performed simultaneously on multiple, separate computer processors in a way that depends only on the previous iteration's solution and the current update of those nodes.

5. A method as in claim 1, further comprising:
   splitting a wavefront of the active list containing a subset of grid nodes wherein the characteristic path changes direction, and
   maintaining grid nodes that split the wavefront until a convergence value is reached.

6. A method as in claim 1, further comprising the step of reactivating grid nodes when a wavefront moves over grid nodes with solutions that have already converged in response to correct values for updated information that is propagated across an image.

7. A method as in claim 1, further comprising the step of removing nodes from the active list whose values have reached an acceptable level of approximation error in a manner that can be done simultaneously on separate processors.

8. A method for solving a Hamilton-Jacobi equation using parallel computing devices, comprising:
   under control of one or more computer systems configured with a processor and a memory;

creating an active list of data point nodes in a grid for the Hamilton-Jacobi equation that are capable of being computed in parallel;

computing approximated solutions to the Hamilton-Jacobi equation for data point nodes in the grid in parallel using the active list of computing nodes;

expanding the active list of computing nodes during each computation iteration to include all data point nodes that are influenced by a current computation iteration;

updating the approximated solutions on the data point nodes in the active list until the data point nodes converge; and displaying the approximated solution using a display volume to an end user.

9. The method as in claim 8, further comprising updating the data point nodes in the active list by adding or removing active data point nodes from the active list based on a convergence measure.

10. The method as in claim 8, further comprising removing a data point node form the active list when a solution on the data point node converges.

11. The method as in claim 10, further comprising re-inserting a data point node into the active list when changes of adjacent neighbors affect a solution of the previously removed data point node.

12. The method as in claim 9, further comprising updates to all data point nodes in the active list simultaneously using a Jacobi update for the parallel computations.

13. The method as in claim 9, further comprising dividing the Hamilton-Jacobi equation into a plurality of partial differential equations to be solved on nodes.

* * * * *